US005573471A

United States Patent [19]
Shubinsky et al.

[11] Patent Number: 5,573,471
[45] Date of Patent: Nov. 12, 1996

[54] TRANSMISSION FOR AN OFF-HIGHWAY IMPLEMENT

[75] Inventors: Vladimir D. Shubinsky, Northbrook; Leslie L. Pagel, Jr., Naperville, both of Ill.

[73] Assignee: Case Corporation, Racine, Wis.

[21] Appl. No.: 404,493

[22] Filed: Mar. 17, 1995

[51] Int. Cl.[6] .................................................. F16M 37/02
[52] U.S. Cl. .......................... 475/207; 475/218; 475/322; 74/325
[58] Field of Search ................................. 475/207, 320, 475/321, 322, 218; 74/325, 331

[56] References Cited

U.S. PATENT DOCUMENTS

| | | | |
|---|---|---|---|
| 2,853,890 | 9/1958 | Kelbel | 74/665 |
| 3,487,724 | 1/1970 | McIntyre et al. | 74/740 |
| 3,774,460 | 11/1973 | Browning et al. | 74/15.84 |
| 3,774,475 | 11/1973 | Meysenburg et al. | 74/740 |
| 4,074,581 | 2/1978 | Stevens | 74/15.66 |
| 4,274,302 | 6/1981 | Herscovici | 74/661 |
| 4,404,869 | 9/1983 | Numazawa et al. | 475/207 |
| 4,416,168 | 11/1983 | Arai et al. | 475/207 X |
| 4,549,443 | 10/1985 | White | 74/360 |
| 4,614,133 | 9/1986 | Nerstad et al. | 74/740 |
| 4,858,495 | 8/1989 | Horsch | 74/745 |
| 4,877,116 | 10/1989 | Horsch | 192/3.57 |
| 5,123,293 | 6/1992 | Umemoto et al. | 74/333 |
| 5,178,039 | 1/1993 | Shirley et al. | 74/331 X |
| 5,239,887 | 8/1993 | Müller et al. | 74/331 X |
| 5,245,892 | 9/1993 | Kim et al. | 74/665 GA |
| 5,248,283 | 9/1993 | Eckhardt et al. | 475/72 |

*Primary Examiner*—Charles A. Marmor
*Assistant Examiner*—Peter Kwon
*Attorney, Agent, or Firm*—Rudnick & Wolfe

[57] ABSTRACT

A transmission for an off-highway implement having a plurality of selectively operable gear meshes arranged between input and output shafts of the transmission. A two-speed planetary section is coupled between the output shaft and the transmission output drive shaft. The planetary section of the transmission includes a sun gear that rotates with the output shaft, a planetary carrier that rotates with the transmission output drive shaft and has a series of planetary gears arranged in intermeshing relationship between a rotatable ring gear and the sun gear. A pair of clutch assemblies selectively condition the planetary section of the transmission and thereby influence the turning ratio between the input shaft and the transmission output drive shaft. To rotatably turn the transmission output drive shaft in a third speed ratio condition relative to the turning speed of the output shaft, a selectively operated drive system is associated with the planetary section of the transmission. The drive system allows selective rotation of the ring gear thereby developing a super low speed ratio between the turning output shaft and the transmission output drive shaft. An adjustment assembly is also disclosed for simplifying adjustment of the end play of elongated shaft assemblies disposed throughout the transmission assembly.

46 Claims, 8 Drawing Sheets

| Gear | TRANSMISSION CLUTCHES ENGAGED, FORWARD | | | | | | | | | |
|---|---|---|---|---|---|---|---|---|---|---|
| | 56 | 58 | 66 | 76 | 78 | 96 | 106 | 132 | 134 | 116 |
| 1 | X | | | | | | | X | X | |
| 2 | | | X | | | | | X | X | |
| 3 | | X | | | | | | X | X | |
| 4 | X | | | | | X | | X | | |
| 5 | | | X | | | X | | X | | |
| 6 | | X | | | | X | | X | | |
| 7 | X | | | X | | | | X | | |
| 8 | | | X | X | | | | X | | |
| 9 | | X | | X | | | | X | | |
| 10 | X | | | | X | | | X | | |
| 11 | | | X | | X | | | X | | |
| 12 | | X | | | X | | | X | | |
| 13 | X | | | | | | X | | X | |
| 14 | | | X | | | | X | | X | |
| 15 | | X | | | | | X | | X | |
| 16 | X | | | | | X | | | X | |
| 17 | | | X | | | X | | | X | |
| 18 | | X | | | | X | | | X | |
| 19 | X | | | X | | | | | X | |
| 20 | | | X | X | | | | | X | |
| 21 | | X | | X | | | | | X | |
| 22 | X | | | | X | | | | X | |
| 23 | | | X | | X | | | | X | |
| 24 | | X | | | X | | | | X | |

FIG. 4B

| Gear | TRANSMISSION CLUTCHES ENGAGED, REVERSE | | | | | | | | | |
|------|----|----|----|----|----|----|-----|-----|-----|-----|
|      | 56 | 58 | 66 | 76 | 78 | 96 | 106 | 132 | 134 | 116 |
| R1   |    |    |    |    |    |    | X   | X   |     | X   |
| R2   |    |    |    |    |    | X  |     | X   |     | X   |
| R3   |    |    |    | X  |    |    |     | X   |     | X   |
| R4   |    |    |    |    | X  |    |     | X   |     | X   |
| R5   |    |    |    |    |    |    | X   |     | X   | X   |
| R6   |    |    |    |    |    | X  |     |     | X   | X   |
| R7   |    |    |    | X  |    |    |     |     | X   | X   |
| R8   |    |    |    |    | X  |    |     |     | X   | X   |

FIG. 4C

| Gear | CREEPER (sun gear pos. 162 is engaged, forward) | | | | | | | | | |
|---|---|---|---|---|---|---|---|---|---|---|
| | 56 | 58 | 66 | 76 | 78 | 96 | 106 | 132 | 134 | 116 |
| Cr1 | X | | | | | | X | | | |
| Cr2 | | | X | | | | X | | | |
| Cr3 | | X | | | | | X | | | |
| Cr4 | X | | | | | X | | | | |
| Cr5 | | | X | | | X | | | | |
| Cr6 | | X | | | | X | | | | |
| Cr7 | X | | | X | | | | | | |
| Cr8 | | | X | X | | | | | | |
| Cr9 | | X | | X | | | | | | |
| Cr10 | X | | | | X | | | | | |
| Cr11 | | | X | | X | | | | | |
| Cr12 | | X | | | X | | | | | |

FIG. 4D

| Gear | CREEPER (sun gear pos. 162 is engaged, reverse) | | | | | | | | | |
|---|---|---|---|---|---|---|---|---|---|---|
| | 56 | 58 | 66 | 76 | 78 | 96 | 106 | 132 | 134 | 116 |
| R Cr1 | | | | | | | X | | | X |
| R Cr2 | | | | | | X | | | | X |
| R Cr3 | | | X | | | | | | | X |
| R Cr4 | | | | | X | | | | | X |

TRANSMISSION FOR AN OFF-HIGHWAY IMPLEMENT

FIELD OF THE INVENTION

The present invention generally relates to a transmission for an off-highway implement and, more particularly, to a transmission having a planetary gear set that can be conditioned to develop a creeper speed output for the transmission.

BACKGROUND OF THE INVENTION

The prior art is replete with various transmission designs for off-highway implements such as tractors and the like. Such transmission designs typically include a casing that houses a plurality of selectively operable gear meshes that transfer rotary power and develop different turning speed ratios between generally parallel shafts rotatably mounted within the transmission. A series of clutch assemblies operably and selectively couple various gear meshes to each other to operate the implement in a selected condition. Some off-highway implement transmissions have a multi-speed transmission section coupled to a multi-range transmission section to offer a multitude of gear ratios capable of developing various ground speeds for the off-highway implement.

During field operation, the transmission of the implement is typically conditioned such that the engine is permitted to operate or run at a specified and generally constant speed thus developing a constant ground speed for the implement. Although the clutch assemblies can be independently conditioned such that the selected gear meshes, in combination, define as many as twelve different ground speeds for the implement, the slowest ground speeds for the implement may still be inadequate for some field operations. For example, it is often desirable to condition the transmission in a super slow speed condition such that the ground speed of the implement is such that it allows workers to perform any special field or gardening operations requiring a slow moving unit, i.e., broccoli harvesting, planting of tomato or other plants, and etc.

Another factor of significance regarding transmission designs is that some off-highway or agricultural implement transmissions have an excessive axial length. Accordingly, it is difficult to fit a transmission having both speed and range transmission sections into only limited space constraints that are typically available with an agricultural implement. Reducing the size of the transmission normally reduces the number of gear ratio combination that are achievable, thus, further complicating the needs mentioned above.

As will be appreciated by those skilled in the transmission art, off-highway implement transmissions often include at least one elongated shaft assembly on which multiple helical gears are mounted in axially spaced relation relative to each other. The elongated shaft assembly is rotatably journalled in the transmission casing or housing by a series of anti-friction bearings. In those transmission designs that utilize three bearings disposed in axially spaced relation along the length of a one-piece shaft, the bearings have been known to not statically support the load imparted thereto by the turning shaft thus offering a statically indeterminate structure and, thus, unpredictable performance.

In some transmission designs, the shaft assembly includes two axially aligned shafts that are interconnected to each other to act as a solid and elongated shaft. Normally, each shaft of the shaft assembly is supported in the casing or housing by a set of two bearings. To address the axial loading applied to the shaft assembly by intermeshing helical gears during operation of the transmission, each bearing set includes two tapered or conical roller bearings; with one bearing being provided toward opposite ends of each shaft of each shaft assembly. Thus, there are as many as four bearings associated with each elongated shaft assembly. As is well known in the art, each bearing set requires adjustment to compensate for clearances inherent between bearing components Shaft end play will be determined by the clearances set for each bearing. Accordingly, in those elongated transmission shaft assemblies that embody two axially aligned and interconnected shafts, two separate adjustments need to be made to each shaft assembly to compensate for axial loading imparted thereto through the intermeshing gear meshes.

Accordingly, there is both a need and a desire for a transmission assembly for an off-highway implement that offers the necessary gear ratio combinations which allow both an extremely slow ground speed coupled with a constant engine speed and a relatively compact design. Furthermore, there is a need and desire for a transmission assembly that embodies a simplified form of adjustment for the bearings that journal axially elongated shafts used in the transmission assembly.

SUMMARY OF THE INVENTION

In view of the above, and in accordance with the present invention, there is provided a transmission assembly for an off-highway implement capable of developing super slow or creeper speed outputs. The transmission assembly includes a casing that houses a series of gear meshes on a series of shaft assemblies including an input shaft assembly and an output shaft assembly. A series of clutch assemblies operably and selectively couple various gear meshes throughout the transmission to effect the transfer of power and establish different turning speed ratios between the input shaft assembly and the output shaft assembly. A transmission output drive shaft is also rotatably supported by the transmission casing.

A two speed planetary section is operably coupled between the output shaft assembly and the transmission output drive shaft. Because of the location and the multiplying essence of the planetary section, the once chosen increments between the gear meshes of the transmission assembly (for example 15% speed increments) will remain the same with or without activation of the planetary section. The planetary section of the transmission includes a sun gear that rotates with the output shaft assembly, a planetary gear set with a planetary carrier that rotates with the transmission output drive shaft, and a rotatable ring gear. In the illustrated embodiment of the invention, a pair of clutch assemblies selectively condition the planetary section of the transmission and thereby influence the turning ratio between the input shaft assembly of the transmission assembly and the transmission output drive shaft.

To facilitate operation of the implement in a super slow or creeper speed condition, a selectively operated drive system is operably associated with the planetary section of the transmission. The drive system allows selective rotation of the ring gear thereby developing a super low speed ratio between the turning output of the output shaft assembly and the transmission output drive shaft.

The drive system preferably includes a drive gear that is selectively engagable with the ring gear of the planetary gear assembly. In a preferred form of the invention, the drive gear derives its rotational input from the output shaft assembly. To promote proper gear ratio reduction, a gear set may be interposed between the input drive gear of the drive system and the ring gear. Notably, the drive system for imparting rotation to the ring gear may be operated on-the-go from an operator's station of the implement.

In a most preferred form of the invention, the transmission assembly includes interconnected speed and range transmission sections. To promote transmission compactability, the speed and range transmission sections are each configured with a countershaft design. The countershaft design of the transmission sections increases the number of gear mesh combinations which can be selectively coupled to each other while compacting the transmission configuration to fit within relatively tight space constraints commonly associated with off-highway implements. The addition of a planetary gear system operably coupled between the output shaft assembly of the range transmission section and the transmission drive output shaft facilitates accomplishment of the desirable ground speeds while allowing the engine of the implement to continually operate at a selected optimum speed thus promoting energy conservation. Also, the provision of a drive system that selectively imparts rotation to the ring gear of the planetary system allows a creeper speed ratio to be accomplished while still allowing the engine of the implement to operate in a peak performance operating range.

The gear meshes disposed throughout the transmission assembly preferably include helical gears arranged in axially spaced relation relative to each other along the lengths of elongated shaft assemblies. As mentioned, the helical gears tend to impart axial loads to the shaft assemblies on which they are mounted. To promote assembly of the transmission, especially in those transmissions designed with both speed and range transmission sections, each elongated shaft assembly disposed throughout the transmission assembly includes first and second axially aligned shafts that are connected to each other intermediate their ends.

In a preferred form of the invention, a set of only three axially aligned bearings are disposed between opposite ends of and rotatably mount each elongated shaft assembly within the transmission casing. Two outer bearings am disposed toward outer ends of the first and second shafts while a third bearing is mounted adjacent to the connection between the first and second shafts of each elongated shaft assembly. The bearings are mounted on the respective shafts of a respective shaft assembly such that they transfer axial movement in a predetermined direction between the shafts of the shaft assembly. An assembly, connected to the casing, imparts axial adjustments to the respective shaft assembly, thus, selectively and conjointly setting clearances for all the bearings. The present design not only reduces the number of bearings required to rotatably support the elongated shaft assembly within the transmission casing, it furthermore simplifies adjustment of the bearings within the transmission casing. Where at least two bearing adjustments were heretofore required for setting elongated shafts, only one easily and quickly accomplished adjustment is now required for all the bearings along the length of each elongated shaft assembly.

Numerous other features an advantages of the present invention will become readily apparent from the following detailed description, the appended claims, and the accompanying drawings.

DETAILED DESCRIPTION OF THE PRESENT INVENTION

While the present invention is susceptible of embodiment in various forms, there is shown in the drawings and will hereinafter be described, a preferred embodiment of the invention with the understanding that the present disclosure is to be considered as an exemplification of the invention and is not intended to limit the invention to the specific embodiment illustrated.

Figure 1:
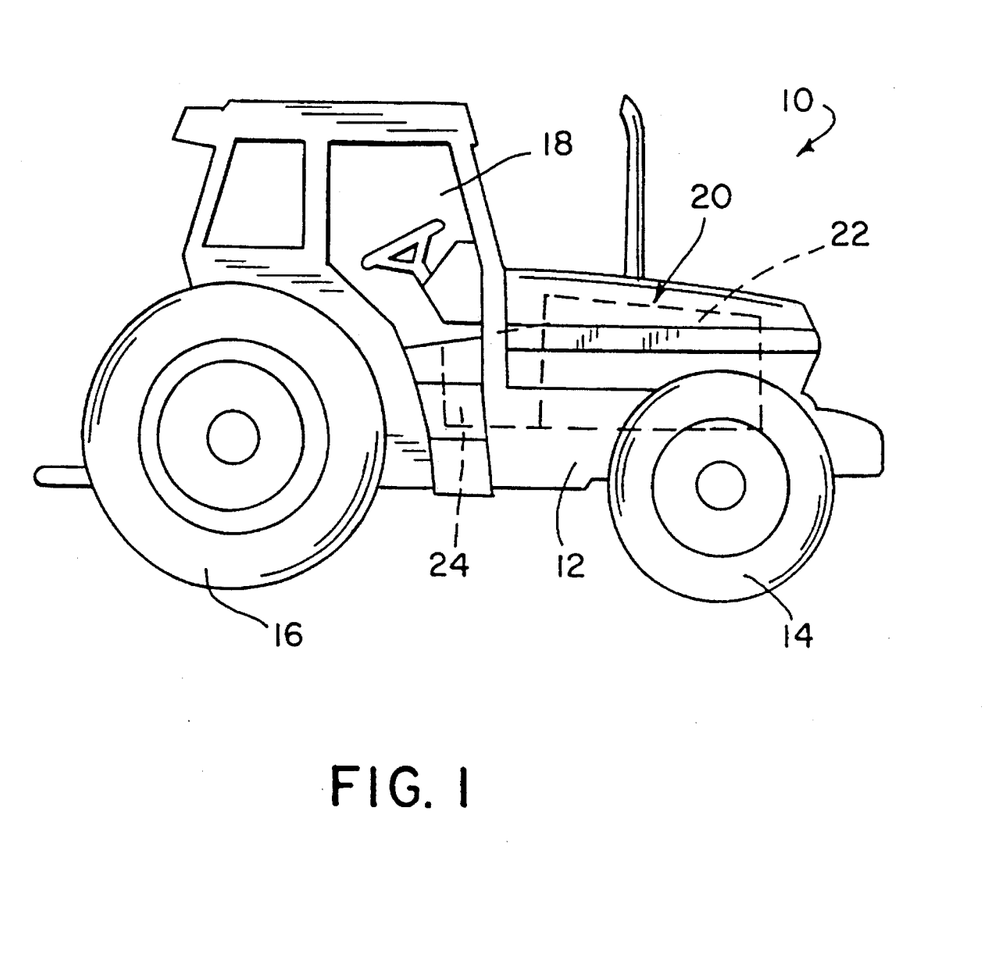
FIG. 1 is a schematic side elevational view of an agricultural implement in which the transmission of the present invention may be embodied.

Referring now the drawings, wherein like reference numerals refer to like parts throughout the several views, the transmission assembly of the present invention is preferably embodied as part of a self propelled off-highway implement such as an agricultural tractor or the like, generally represented by reference numeral 10. It should be appreciated, however, that the broadest teachings of the present invention can equally apply to other forms of off-highway implements. The implement 10 includes a fore-and-aft frame 12 which, in the illustrated embodiment of the invention, is supported on a front pair of wheels 14 and a rear pair of wheels 16. The frame 12 preferably supports a body including an enclosed operator station or cab region 18 wherein the operator is positioned during operation of the implement to control various functions of the implement. The implement 10 further includes a power train 20 including a self propelled engine 22 and transmission assembly 24 mounted on the frame 12.

Figure 2:
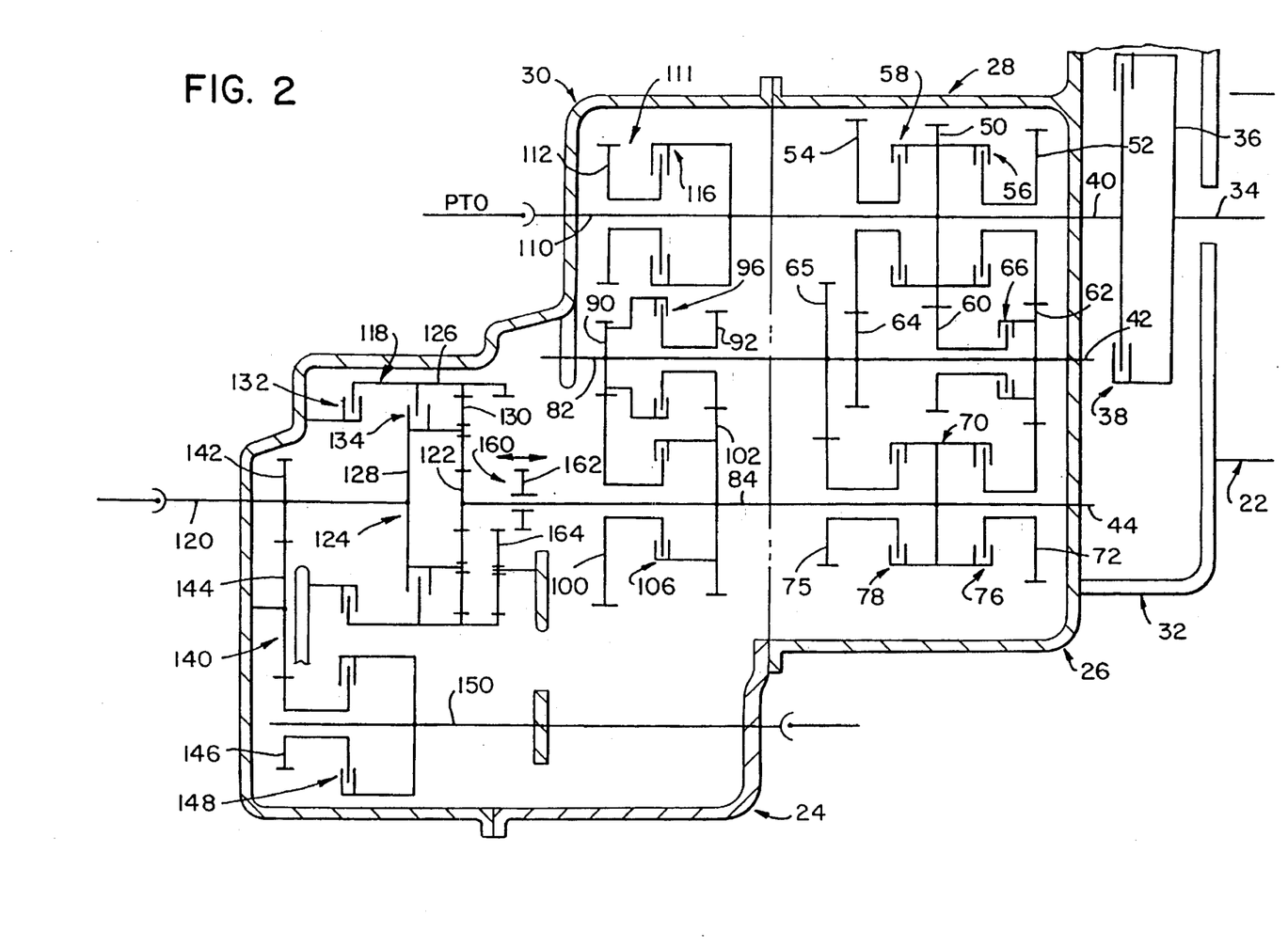
FIG. 2 is a diagrammatic developed but substantially side elevational view of a transmission constructed in accordance with the present invention.

The transmission assembly 24 is schematically represented in its entirety in FIG. 2. The transmission 24 includes a casing or housing 26 in which a plurality of various gear meshes are arranged for establishing different speed ratios for the transmission. In the illustrated form of the invention, the transmission assembly 24 is divided into a multi-speed transmission section 28 and a multi-range transmission section 30. As shown, the speed transmission section 28 and range transmission section 30 are disposed in a tandem arrangement. Again, it should be appreciated that the broadest teachings of the present invention apply to both the illustrated form of the invention as well as other types of transmission assemblies that may not necessarily include speed and range transmission sections.

In the illustrated embodiment, the speed transmission section 28 of transmission 24 is connected to the engine 22. That is, the housing 26 of the transmission 24 is connected to a rear portion of an engine via a flywheel housing 32. The engine's crankshaft 34, having a flywheel 36 arranged thereon, transfers power and torque from the engine 22 through a torque limiter/dampener mechanism 38 to the speed transmission section 28 of the transmission 24.

In the embodiment of the invention illustrated in FIG. 2, the speed transmission section 28 is configured to provide at least three different or stepped speed ratios between input and output ends thereof for any given input speed from the engine 22. More specifically, the speed transmission section 28 includes an input shaft 40 that is rotatably supported by and extends through housing 26. To promote compactness of the transmission, the speed transmission section 28 further includes a countershaft 42 that is rotatably mounted in the housing 26. The speed transmission section 28 further includes an output shaft 44 rotatably supported in the housing. The input shaft 40, countershaft 42, and the output shaft 44 are arranged in the housing 26 in generally parallel relation relative to each other.

A series of gear meshes are provided on the shafts 40, 42 and 44 for deriving the various speed ratios for the speed transmission section 28. As shown, an input drive gear 50 is adapted to rotate with the input shaft 40. In the illustrated embodiment, input shaft 40 also has drive gears 52 and 54 mounted for normally free rotation thereabout. Gear 52 is selectively connected to rotate with a shaft 40 as through a clutch assembly 56. Similarly, drive gear 54 is selectively connected to rotate with shaft 40 as through a clutch assembly 58.

The countershaft 42 of the speed transmission section 58 has a series of gears 60, 62, 64 and 65 mounted thereon. Gears 60 is in constant mesh with input drive gear 50 and is normally freely rotatable relative to the countershaft 42. Gear 60 is selectively connected to impart rotation to the countershaft 42 as through a clutch assembly 66. Gears 62, 64 and 65 are splined or otherwise affixed to rotate with countershaft 42. Gear 62 is in constant mesh with input drive gear 52 and gear 64 is in constant mesh with input drive gear 54.

The output shaft 44 of the speed transmission section 28 likewise has gears 72 and 75 mounted thereon. As shown, clutch housings 70 are welded or otherwise secured to rotate with shaft 44. Gears 72 and 75 are normally freely rotatable about shaft 44. In the illustrated embodiment gear 72 is in constant mesh with gear 62 on countershaft 42 and serves to impart rotation to output shaft 44 through a clutch assembly 76. Similarly, gear 75 is in constant mesh with gear 65 on countershaft 42 and serves to impart rotation to the output shaft 44 of the speed transmission section 28 through a hydraulically actuated clutch assembly 78.

In the illustrated embodiment of the invention shown in FIG. 2, the range transmission section 30 of transmission 24 is configured to provide at least four different or stepped gear ratios for any given input speed from the speed transmission section 28. More specifically, the range transmission section 30 includes shafts 82 and 84 that are each rotatably supported in housing 26 and extend generally parallel to each other. In a preferred form of the invention, shaft 82 is axially aligned and suitably connected to shaft 42 of the speed transmission section 28 such that rotating or turning movement of shaft 42 is likewise imparted to shaft 82 of the range transmission section 30. Similarly, in a preferred form of the invention, the output shaft 84 of the range transmission section 30 is axially aligned with and suitably connected to shaft 44 of the speed transmission section 28. Thus, rotating or turning movements of shaft 44 are imparted to shaft 84 of the range transmission section 30.

A series of gear meshes are provided on the shafts 82 and 84 for deriving the various speed ratios which can be accomplished within the range transmission section 30 of the transmission 24. As shown, an input drive gear 90 is part of or otherwise affixed to rotate with shaft 82. In the illustrated embodiment, shaft 82 has drive gear 92 mounted for normal free rotation thereabout. Gear 92 is selectively connected to rotate with shaft 82 as through a clutch assembly 96.

The output shaft 84 of the range transmission section 30 has gears 100 and 102 mounted thereon. Gear 100 is in constant mesh with input drive gear 90 on countershaft 82 of the range transmission section 30 and is mounted for free rotation about the axis of shaft 84. Gear 102 is in constant mesh with gear 92 on shaft 82 and is splined or otherwise affixed to rotate with shaft 84. A clutch assembly 106 serves to selectively couple gear 100 to gear 102 and, thus, to shaft 84.

In a preferred form of the invention, the range output section 30 of the transmission 24 further includes a power takeoff (PTO) shaft 110 that is rotatably mounted in and extends from the housing 26. As shown, shaft 110 is axially aligned with and connected to input shaft 40 of the speed transmission section 28. As illustrated, shaft 110 carries a reverse speed output drive gear assembly 111. The reverse gear assembly includes a reverse gear 112 that is freely rotatable about shaft 110 and is in constant mesh with gear 100 on the output shaft 84 of the range transmission section. The reverse gear 112 is selectively connected to the PTO shaft 110 as by a clutch assembly 116.

The various clutch assemblies 56, 58, 66, 76, 78, 96, 106 and 116 disposed throughout the transmission 24 are preferably designed as conventional ON/OFF hydraulically actuated clutches that are typically controlled from the cab region of the implement 10 by selecting certain speed or gear ratios. Hydraulic fluid inputs to each clutch assembly are affected through suitable hydraulic valves and channels or lines (not shown) communicating with a conventional pressurized hydraulic system on the implement 10.

In the illustrated embodiment of the invention, and depending upon which gear meshes within the transmission assembly 24 are ranged in combination relative to each other, the speed and range transmission sections 28 and 30, respectively, of the transmission assembly 24 combine to define at least twelve different gear ratio combinations for any given input speed imparted to the transmission assembly 24.

The output speed ratio of the range transmission section 30 of the transmission assembly 24 may be further modulated by a two speed planetary assembly 118 operably disposed between output shaft 84 and a transmission output drive shaft 120. The transmission output drive shaft 120 is supported for rotation and extends beyond the transmission housing 26. In the preferred embodiment, the transmission output drive shaft 120 is axially aligned with shaft 84 of the transmission assembly 24.

Figure 3:
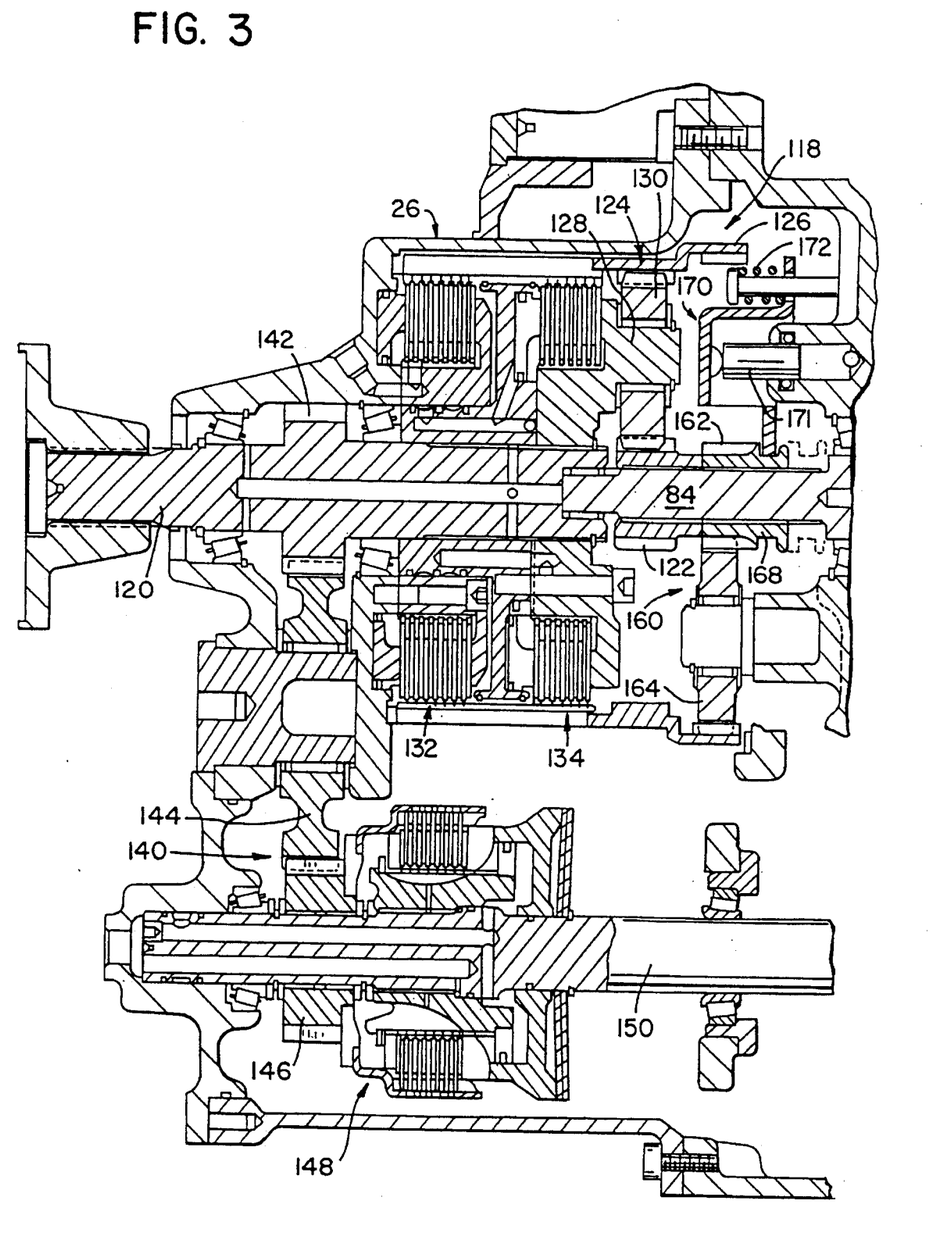
FIG. 3 is an enlarged sectional view of a planetary gear section of the transmission.

In the illustrated embodiment, the two speed planetary assembly includes a sun gear 122, a planetary gear set 124 and a floating ring gear 126. As shown, the sun gear 122 is mounted for rotation with shaft 84. Preferably, the sun gear 122 is splined to shaft 84. In the illustrated embodiment, the planetary gear set 124 includes a planet pinion carrier 128 that is operably connected to the transmission output drive shaft 120 and carries a plurality of planetary pinions 130 which mesh respectively with the sun gear 122 and ring gear 126. Ring gear 126 is concentrically mounted about the sun gear 122.

In the illustrated embodiment of the invention, the output of the planetary gear assembly 124 and, thus, the turning ratio of the transmission output drive shaft 120 relative to the input shaft 40 to the transmission is influenced by "low" and "high" speed clutch assemblies 132 and 134, respectively, which are operably associated with the two speed planetary assembly 118.

One of the salient features of the present invention is that the ring gear 126 of the planetary assembly 118 is mounted for rotation relative to the transmission housing 26 and about the axis of the transmission output shaft 120. Rotation of the ring gear 126 relative to the housing 26 is selectively controlled by the low speed clutch assembly 132 that is operably interposed between the housing 26 and the ring gear 126. In one state, the low speed clutch assembly 132 prevents rotation of the ring gear 126 relative to the housing 26 while in another state, the clutch assembly 132 permits rotation of the ring gear 126 relative to the housing 26. The high speed clutch assembly 134 is interposed between the planet pinion carrier 130 and the ring gear 126 to control relative rotation therebetween.

The clutch assemblies 132 and 134 are designed as modulation clutches which allow controlled slippage without adversely effecting clutch performance over an extended time period. In the preferred embodiment, each clutch 132, 134 is a hydraulically actuated assembly. Suitable hydraulic valves, channels or lines (not shown) are provided between the clutch assemblies 132, 134 and the pressurized hydraulic system (not shown) conventionally provided on the implement 10.

In the illustrated embodiment, the transmission assembly 24 is configured with a normally engaged mechanical front wheel drive assembly 140 for imparting rotation to the front wheels 14 of the implement 10. As shown, the front wheel drive assembly 140 includes a drive gear 142, an idler gear 144, and an output gear 146 that combines with a spring engaged clutch assembly 148 to selectively drive an output shaft 150 connected to the front wheels 14 of the implement. In the illustrated embodiment, the drive gear 142 is mounted within housing 26 for rotation with the transmission output drive shaft 120. In the most preferred form of the invention, the drive gear 142 is integrally formed on or otherwise affixed to the transmission output drive shaft 120. The idler gear 144 is in constant mesh with the drive gear 142 and is mounted for fixed rotation relative to the housing 26. The output gear 146 is in constant mesh with the idler gear 144 and thereby the input drive gear 142 mounted on the transmission output shaft 120. In the illustrated form of the invention, gear 146 is rotatable about the longitudinal axis of output drive shaft 150 and is normally engaged with the shaft 150 through the spring engaged clutch assembly 148. In a most preferred form of the invention, the clutch assembly 148 is a hydraulically actuated ON/OFF clutch assembly that is selectively controlled from the cab region of the implement. Selective operation of the clutch assembly 148 disconnects the output gear 146 from the output shaft 150 thereby conditioning the transmission assembly 24 into a 2-wheel drive mode.

Another salient feature of the present invention involves the provision of a drive system 160 arranged in combination with the two speed planetary gear assembly 124 for developing a super low speed ratio for the transmission output drive shaft 120 for each speed ratio output of the output shaft 84 of the range transmission section 30. In the preferred form of the invention, the drive system 160 for accomplishing the super low speed ratio output for the transmission output drive shaft 120 is selectively controlled on-the-go from the operator's station 18 of the implement.

As shown in FIGS. 2 and 3, the drive system 160 includes a drive gear 162 for selectively conditioning the two speed planetary gear assembly 124 to develop a super low or creeper speed ratio for the transmission output drive shaft 120. More particularly, the drive gear 162 acts as a second sun gear for the planetary gear assembly 124 and is operably movable into and out of driving engagement with the ring gear 126. As shown, a series of idler gears 164 are mounted for rotation within housing 26 and are adapted to intermesh in driving engagement with the ring gear 126 and drive or sun gear 162.

In the illustrated form of the invention, shown in FIGS. 2 and 3, drive gear 162 of the drive system 160 derives its rotation from shaft 84. In a most preferred form of the invention, the drive gear 162 is splined for linear endwise movement in opposite directions along the length of shaft 84. The drive gear 162 is movable between a first position, wherein drive gear 162 is disengaged from the ring gear 126, and a second position. In the second position, the drive gear 162 intermeshes with the ring gear 126 thereby imparting rotation thereto preferably through the idler gears 164. As will be appreciated by those skilled in the art, the output speed ratio of the transmission output drive shaft 120 when the drive system 160 is engaged, will be determined by the combination of the relative gear ratios between the sun gear 162, the idler gears 164, the ring gear 126, as well as the sun gear 122, planetary pinions 130 and the common ring gear 126.

As shown in FIG. 3, gear 162 is preferably provided with a conventional shift collar 168 that is coupled to one end of a suitable shift mechanism 170. In a preferred form of the invention, a suitable actuator, such as a hydraulically actuated piston 171, is operably coupled to and controls the position of gear 162 relative to the ring gear 126. From the cab region of the implement a signal is sent by the operator to a conventional hydraulic solenoid valve to selectively move gear 162 into engagement with the ring gear 126 to establish a super low speed ratio output for the transmission. In the illustrated embodiment of the invention, a resilient spring 172 pushes the piston 171 to urge gear 162 toward a disengaged second position.

Figure 4A:
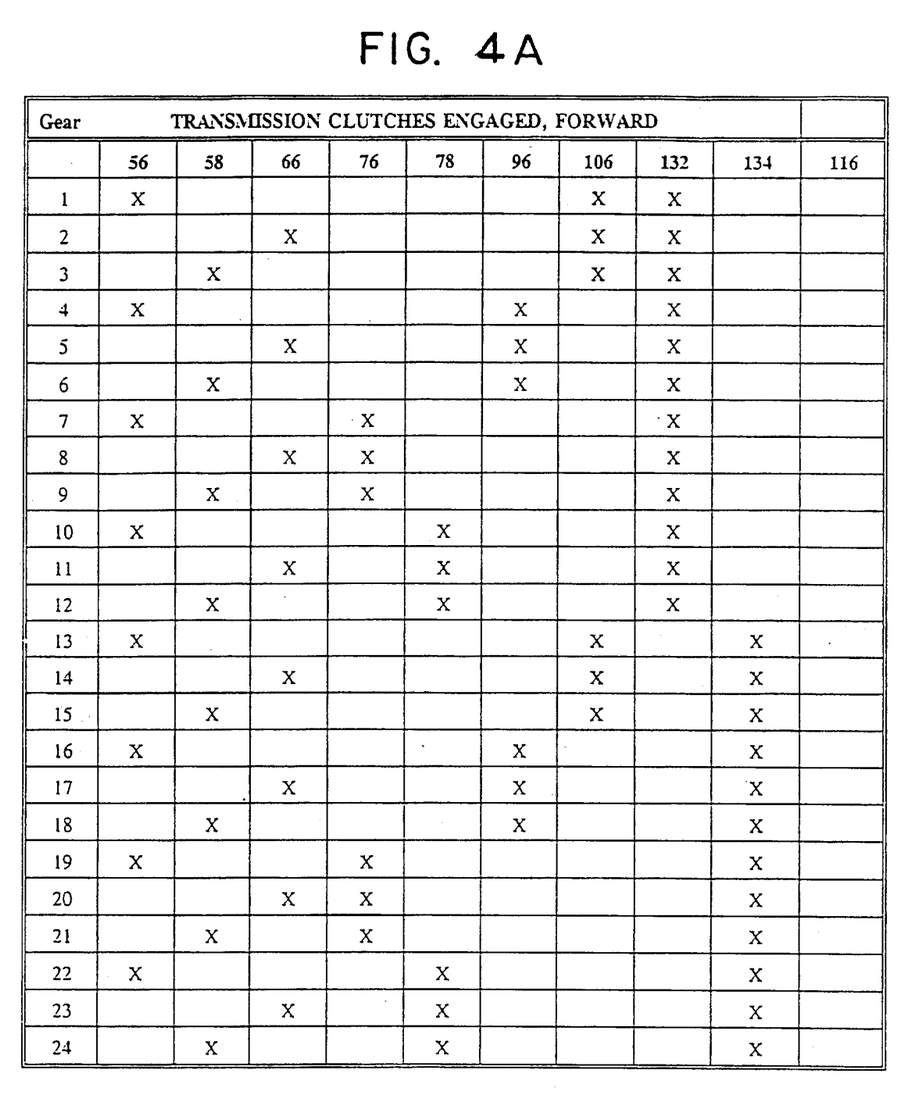
FIGS. 4A–4D are tables which show the relationship among the various gear ratios and the clutch assemblies which are engagable to achieve those gear ratios.
Figure 4B:
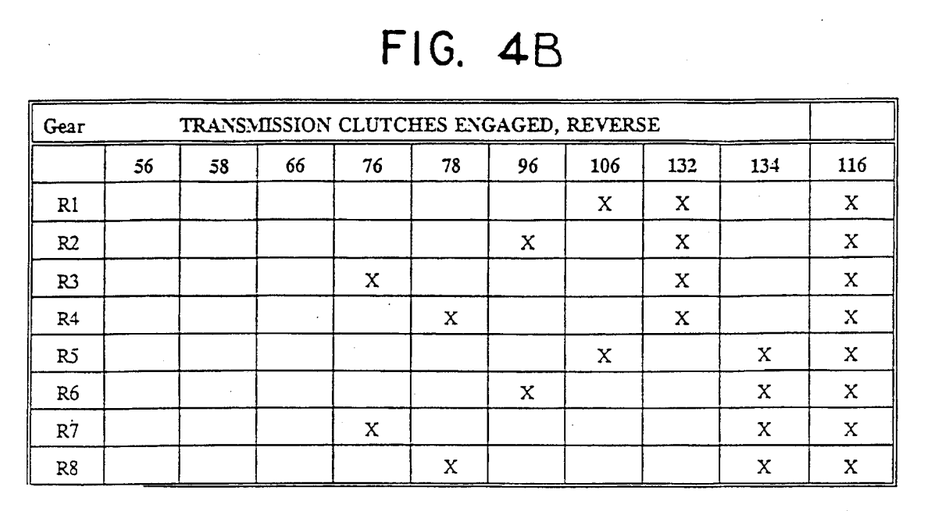
Figure 4C:
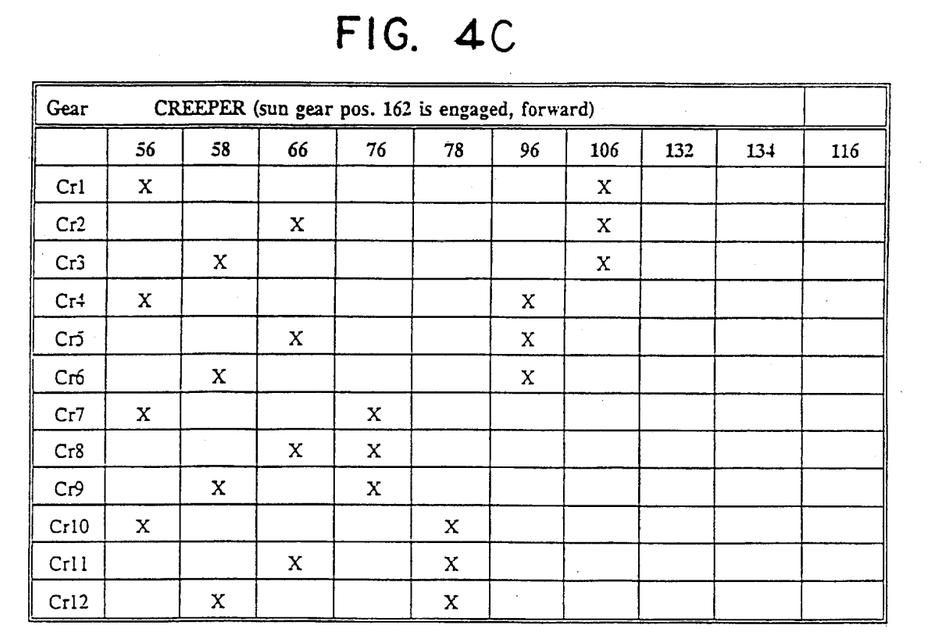
Figure 4D:
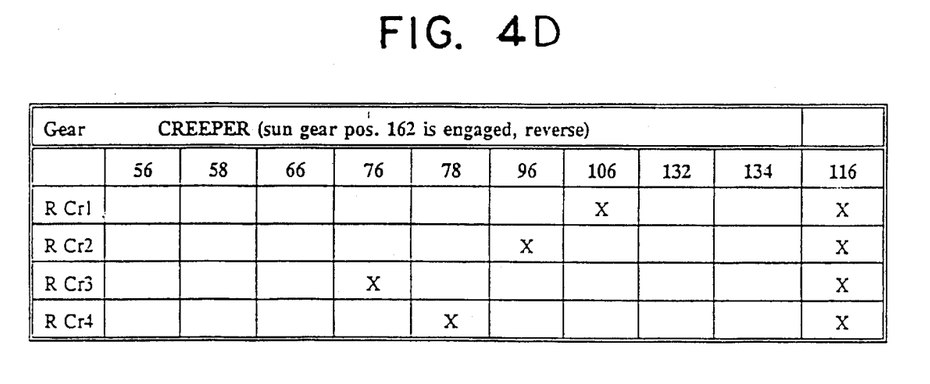

The various forward gear meshes disposed throughout the speed and range transmission sections 28 and 30, respectively, of the transmission offer about a 15% change between adjacent gear ratios. FIGS. 4A and 4B show tables listing the various clutch assemblies which are selectively engaged to obtain different sets of output speeds for any given input speed to the transmission assembly. Notably, the speed ratio differences involved between the 12th and 13th gear ratios may be less than 15% and may have an overlapping characteristic to achieve clutch swapping and thus enhancing transmission assembly performance in those shift conditions wherein up to three clutches need to be swapped or changed to effect a consecutive gear shift.

To effect reversal of the transmission output drive shaft 120, the reverse speed output drive gear assembly 111 is selectively operated. That is, when clutch assembly 116 is operated to couple reverse gear 112 to shaft 110, power is transmitted between gears 112, 100 and, with clutch 106 engaged, to shaft 84. Accordingly, the direction of the output shaft 84 and thereby the transmission output drive shaft 120 are reversed from their normal direction of rotation. To select the remainder of the available reverse speeds, clutches 76, 78, 92 132 and 134 could be selectively operated. Accordingly, eight different reverse speeds could be achieved.

With the transmission design of the present invention, power can also be transmitted to the front wheels 14 of the machine through the mechanical front wheel drive assembly 140. The gears 142 and 144 of assembly 140 combine to rotate the output drive gear 146. As mentioned above, gear 146 is normally coupled to the output shaft 150 through the spring engaged clutch assembly 148 thereby providing output drive power to the front wheels 14 of the machine 10.

Power is likewise transmitted outside of the transmission through the PTO shaft 110. In the illustrated embodiment, the transmission input shaft 40 drives the PTO shaft 110. As such, power is transmitted to the PTO shaft 110 at engine speed.

Another aspect of the present invention relates to the manner by which the axially aligned shafts 40, 110 and 42, 82 and 44, 84 are mounted within the transmission casing 26. As is conventional, gears 50, 52, 54 and 112 on shafts 40 and 110, respectively, gears 60, 62, 64, 65 and 90, 92 on shafts 42 and 82, respectively, and gears 72, 75 and 100, 102 on shafts 44 and 84, respectively, each have a helical tooth configuration. Accordingly, during operation of the transmission assembly 24, the intermeshing gears tend to impart axial loads to the respective shafts thus complicating mounting of the shafts within the casing 26.

Figure 5:
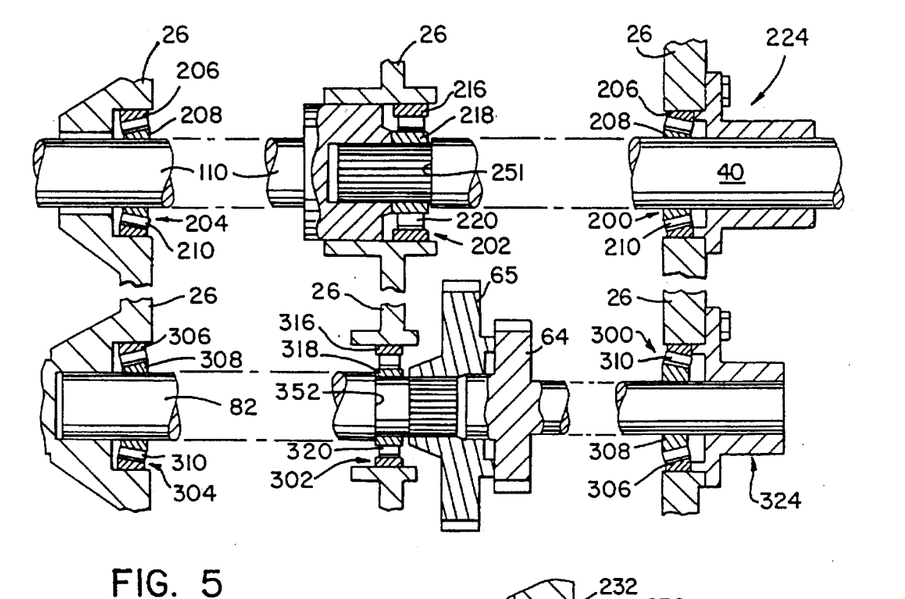
FIG. 5 is an enlarged schematic view of an elongated shaft assembly with an adjusting mechanism forming part of the transmission assembly of the present invention.

As shown in FIG. 5, shaft 40 is spline connected to shaft 110. In the illustrated form of spline connection, shaft 40 is provided with an externally splined "male" end that is endwise slidably accommodated within an internally splined bore defined at the end of shaft 110.

As shown in FIG. 5, a set of three axially aligned anti-friction bearings 200, 202 and 204 rotatably mount both shafts 40 and 110 within the casing 26. In the illustrated embodiment of the invention, bearings 200 and 204 are conventional tapered or conical roller bearings that are mounted toward the outer ends of shafts 40 and 110, respectively, in opposed relation relative to each other. As is conventional, bearings 200 and 204 each comprise a tapered outer race 206, a tapered inner race 208, and a plurality of preferably cylindrical anti-friction elements or rollers 210 therebetween. Bearing 202 is a conventional cylindrical bearing that is mounted adjacent to the spline connection between shafts 40 and 110. As is conventional, bearing 202 includes an outer race 216, an inner race 218 and a plurality of preferably cylindrical anti-friction elements or rollers therebetween.

Figure 6:
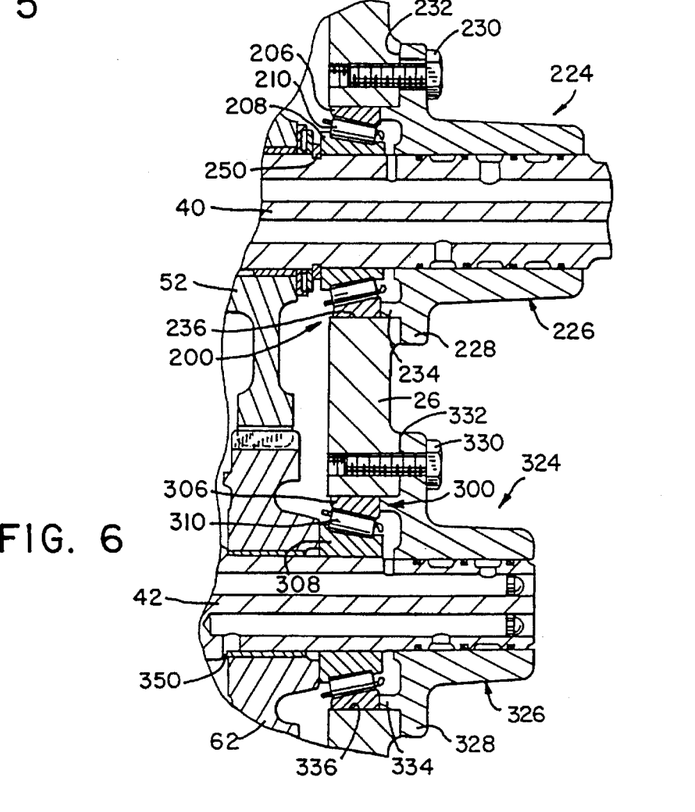
FIG. 6 is an enlarged detail view of a portion of the adjusting mechanism shown in greater detail and in partial section.

An assembly 224 is connected to the exterior of the casing 26 to conjointly adjust all three bearings 200, 202 and 204 through a single adjustment allowed from one end of the shaft 40 thereby setting the end play for the shafts 40 and 110. As shown in FIG. 6, assembly 224 preferably includes an end cap 226 that slidably fits over the end of shaft 40. It should be appreciated, however, that the end cap 226 could likewise be arranged at the free end of shaft 110 without departing or detracting from the spirit and scope of the present invention. As shown, end cap 226 is configured with a flange 228 that extends radially outward from the shaft 40 and that is configured to abut with casing 26. The flange 228 facilitates the releasable connection of cap 226 to casing 26 as with a series of threaded fasteners 230. A series of shims 232 are disposed between the flange 228 and the casing 26 to allow for axial adjustment of the end cap 226 along the length of the shaft 40. Preferably, the shims 232 will be of different thicknesses to promote accurate and reliable adjustment of the end play of the shafts 40 and 110. End cap 226 is further provided with a generally annular flange 234 that extends axially past the flange 228 parallel to the longitudinal axis of shaft 40 and toward the interior of the casing 26.

Figures 7, 8:
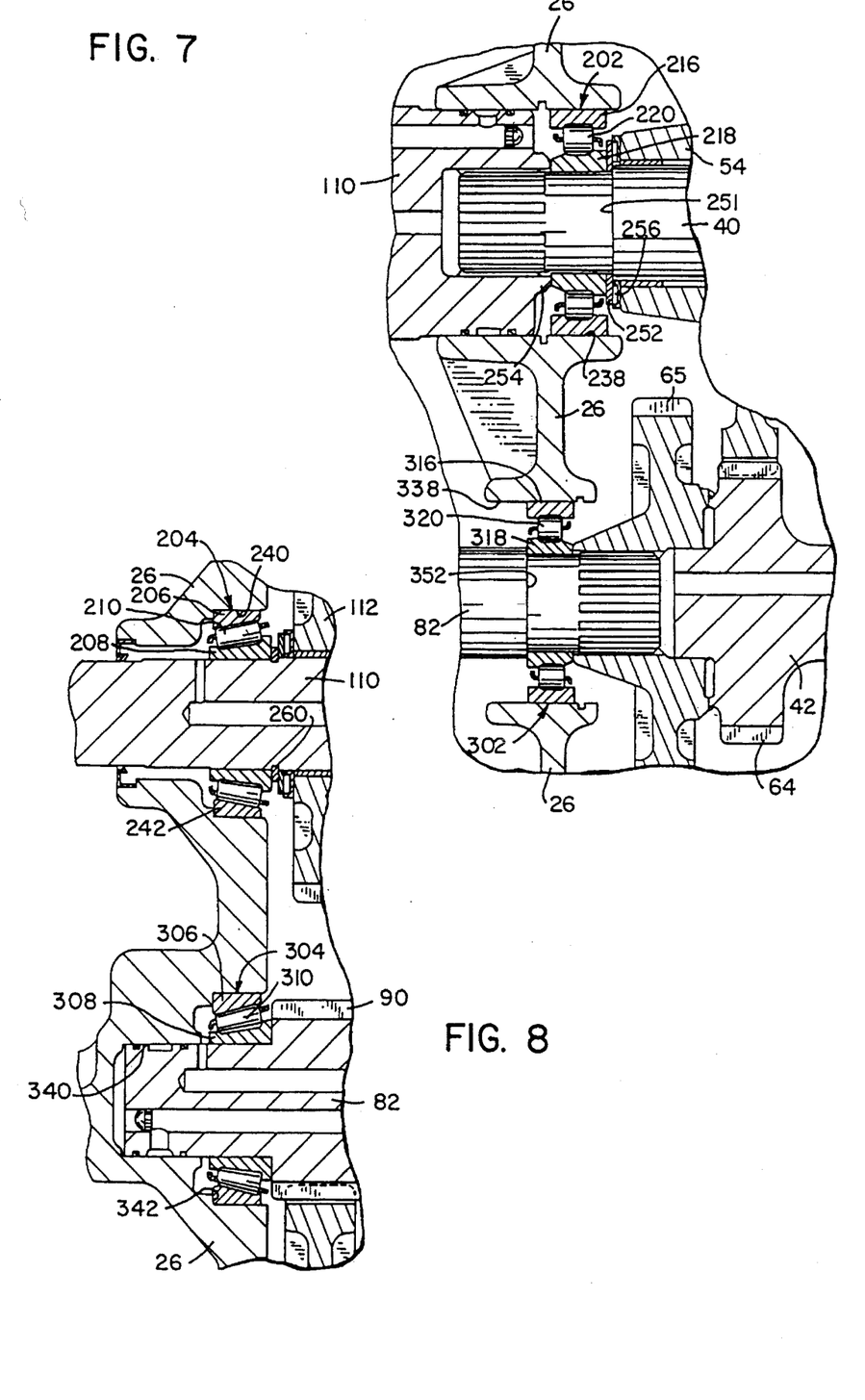
FIG. 7 is an enlarged detail view of another portion of the adjusting mechanism shown in greater detail and in partial section.
FIG. 8 is an enlarged detail view of still another portion of the adjusting mechanism shown in greater detail and in partial section.

Notably, housing 26 is provided with a cylindrical bore 236 that extends parallel to the longitudinal axis of shaft 40 and accommodates the outer race 206 of bearing 200 for movement along a path of travel extending parallel to the axis 40. Similarly, and as shown in FIG. 7, housing 26 is provided with a cylindrical bore 238 that extends parallel to the longitudinal axis of shaft 40 and accommodates the outer race 216 of bearing 202 for movement along a predetermined path of travel extending parallel to the axis of shaft 40. Moreover, and as shown in FIG. 8, housing 26 is provided with a bore 240 that extends parallel to the longitudinal axis of shaft 110 and accommodates the outer race 206 of bearing 204. In the illustrated form of the invention shown in FIG. 8, a radial step 242 is defined by the housing 26 in bore 242 thereby limiting axial movement of the outer race 206 of bearing 204 in a predetermined direction parallel to the axis of shaft 110.

In the embodiment of the invention illustrated in FIG. 6, a snap ring or other suitable device 250 is secured to shaft 40 adjacent to interior surface of the inner race 208 of bearing 200. Turning to FIG. 7, at its opposite end, shaft 40 is provided with a reduced diameter axially extending from the spline at the distal end of the shaft. This reduced diameter on shaft 40 provides a step or annular shoulder 25 1 on shaft 40. The inner race 218 of bearing 202 is fitted on this reduced shaft section and is axially located against shaft 110. An annular washer 252 or other suitable device is provided on shaft 40 between the inner race 218 of bearing 202 and the shoulder 251, which creates a side race for a thrust bearing 256. The thrust bearing 256 is preferably disposed between the hub of gear 54 and washer 252 to minimize the effect of differential turning speeds between gear 54 and washer 252. Moreover, and as shown in FIG. 7, the interior end of shaft 110 is provided with a annular shoulder 254 that axially extends parallel to shaft 110 and toward bearing 202. In the illustrated form of the invention, the diameter of shoulder 254 is approximately equal to the diameter of the inner race 218 of bearing 202. Also, and as shown in FIG. 8, a snap ring 260 is secured to shaft 110 adjacent to the interior side of the inner race 208 of bearing 204.

During assembly of the transmission 24, and especially in those transmissions having both speed and range transmission sections, it is preferable to divide an elongated shaft assembly into interconnected shafts of shorter lengths. The problem with such a design involves how to rotatably support each shaft and how to accomplish adjustment of the shafts to set the proper free play for such a shaft design. With the present invention, the end cap 226 is arranged over the shaft 40 with the shims 232 being disposed between the flange 228 and the housing 26. As seen in FIG. 6, the end cap 226 is moved to the left until the flange 234 of the end cap 226 engages the outer race 206 of bearing 200. Upon engagement of the end cap 226 with bearing 200, further axial movement of the cap 226 toward the left results in corresponding axial movement of both races 206 and 208 of bearing 200. Axial movement of inner race 208 transfers to axial movement of the shaft 40 through snap ring 250. Axial movement of the shaft 40 pushes bearing 202 toward shaft 110 as through ring 252 and the inner race 218. Because bearing 202 is fitted within a cylindrical bore 238, the outer race 216 of bearing 202 has no effect on the axial movement of the bearing 202 toward shaft 110. Axial movement of the bearing 202 toward shaft 110 ultimately results in axial movement of the shaft 110 that is, in turn, transferred to the inner race 208 of bearing 204. The outer race 210 of bearing 204 is inhibited from moving, however, after the outer race 210 abuts with the shoulder 242 in bore 240. Accordingly, the end cap 226 is axially adjusted until the desired amount of free play is established in the bearings 200, 202 and 204. The shims 232 between the end cap 226 and the housing 26 maintain the end play selected for the shafts. Hence, shimming from one side will adjust the position for bearing 202 and the end play for bearings 200 and 204.

Adjustment of the shafts 42 and 82 is accomplished in a manner similar to that discussed above. As shown in FIG. 5, shaft 82 preferably has a spline at the interior end thereof and to which helical gear 65 is spline connected. In the illustrated embodiment, gear 65 is welded or otherwise affixed to adjacent gear 64 such that rotation of shaft 42 is imparted to shaft 82.

As shown in FIG. 5, a set of three axially aligned anti-friction bearings 300, 302 and 304 rotatably mount both shafts 42 and 82 within the casing 26. In the illustrated embodiment of the invention, bearings 300 and 304 are conventional tapered or conical roller bearings that are mounted toward the outer ends of shafts 42 and 82, respectively, in opposed relation relative to each other. As is conventional, bearings 300 and 304 each comprise a tapered outer race 306, a tapered inner race 308 and a plurality of preferably cylindrical anti-friction elements or rollers 310 therebetween. Bearing 302 is a conventional cylindrical bearing that is mounted adjacent to the connection between shafts 42 and 82. As is conventional, bearing 302 includes an outer race 316, an inner race 318, and a plurality of preferably cylindrical anti-friction elements or rollers 320 therebetween.

An assembly 324 is connected to the exterior of the casing to conjointly adjust all three bearings 300, 302 and 304 through a single adjustment allowed from one end of the shaft 42 thereby setting the end play for the shafts 42 and 82. As shown in FIG. 6, assembly 324 preferably includes an end cap 326 that slidably fits over the end of shaft 42. It should be appreciated, however, that the end cap 326 could likewise be arranged at the free end of shaft 82 without departing or detracting from the spirit and scope of the present invention. As shown, end cap 326 is configured with a radial flange 328 that extends outwardly from the shaft 42 and that is configured to abut with casing 26. The flange 328 facilitates the releasable connection of cap 326 to casing 26 as with a series of threaded fasteners 330. A series of shims 332 are disposed between the flange 328 and the casing 26 to allow for axial adjustment of the end cap 326 along the length of the shaft 42. Preferably, the shims 332 will be of different thicknesses to promote accurate and reliable adjustment of the end play of the shafts 42 and 82. End cap 326 is further provided with a generally annular flange 334 that extends axially past the flange 328 parallel to the longitudinal axis of shaft 42 and toward the interior of the casing 26.

Notably, housing 26 is provided with a cylindrical bore 336 that extends parallel to the longitudinal axis of shaft 42 and accommodates the outer race 306 of bearing 300 for movement along a path of travel extending parallel to the longitudinal axis of shaft 42. Similarly, and as shown in FIG. 7, housing 26 is provided with a cylindrical bore 338 that extends parallel to the longitudinal axis of shaft 42 and accommodates the outer race 316 of bearing 302 for sliding movements along a predetermined path of travel extending parallel to the axis of shaft 42. Moreover, and as shown in FIG. 8, housing 26 is provided with a bore 340 that extends parallel to the longitudinal axis of shaft 82 and accommodates the outer race 306 of bearing 304. In the illustrated form of the invention shown in FIG. 8, a radial step or shoulder 342 is defined by the housing 26 in bore 342 thereby limiting axial movement of the outer race 306 of bearing 304 in an outer direction parallel to the axis of shaft 82.

In the embodiment of the invention illustrated in FIG. 6, the interior surface of the inner race 308 of bearing 300 abuts against the hub of helical gear 62 mounted for rotation on shaft 42. On the opposite side, hub of helical gear 62 engages a radial shoulder or step 350 provided on the diameter of shaft 42 thereby limiting axial movement of the gear 62 toward the left as shown in FIG. 6.

Turning to FIG. 7, shaft 82 is provided with a radial shoulder or step 352 axially displaced from the interior end of the shaft 82. As shown, the inner race 318 of bearing 302 is carried on shaft 82 between the inner end thereof and the step 352. Axial movement of gear 64 to the left, as seen in FIG. 7, likewise moves gear 65 to the left as seen in FIG. 7. Moreover, and as shown in FIG. 7, the hub of gear 65 is configured such that the end adjacent to bearing 302 is approximately equal in diameter to the inner race 318 of bearing 302. Also, and as shown in FIG. 8, the hub of helical gear 90 on shaft 82 is approximately equal in diameter to the inner race 308 of bearing 304.

As mentioned above, transmission assemblies preferably configure elongated shaft assemblies with two interconnected shafts arranged in axial alignment. An elongated shaft assembly having two interconnected shafts arranged in axial alignment is particularly advantageous in those transmissions having both speed and range transmission sections. With the present invention, adjustment of the shaft end play is easily and readily accomplished through a single adjustment of the end cap 326 arranged over the shaft 42 with the shims 332 being disposed between the flange 328 and the housing 26.

As seen in FIG. 6, the end cap 326 is moved to the left until the axially extending flange 334 of the end cap 326 engages the outer race 306 of bearing 300. Upon engagement of the end cap 326 with bearing 300, further axial movement of the cap 326 toward the left results in corresponding axial movement of both races 306 and 308 of bearing 300. Axial movement of race 308 transfers to axial movement of the shaft 42 through the abutting relationship of helical gear 62 with the radial step or shoulder 350 on shaft 42. Axial movement of the shaft 42 is transferred to axial movement of gears 64 and 65. Leftward axial movement of the gear 65 as seen in FIG. 7 imparts axial movement to the inner race 318 of bearing 302. Because housing 26 is provided with a cylindrical bore 338, the outer race 316 of bearing 302 has no effect on the axial movement of the bearing 302 along shaft 82.

Axial movement of bearing 302 is transferred to shaft 82 upon engagement of the inner race 318 with the shoulder 352 defined on shaft 82. Leftward axial movement of shaft 82 is imparted to the inner race 308 of bearing 304 through the hub of helical gear 90. The outer race of bearing 304 is inhibited from axial movement in the direction of shaft 82 after the outer race 306 abuts with the shoulder 342 in bore 340. Accordingly, the end cap 326 is axially adjusted until the desired amount of free play is established in the bearings 300, 302 and 304. The shims 332 between the end cap 326 and the housing 26 maintain the end play selected for the shafts 42 and 82. Hence, shimming from one side or end will likewise adjust the position of bearing 302 and the end play for bearings 300 and 304.

The end play for the shafts 44 and 84 can be accomplished in a substantially similar manner to that described above or any combination thereof.

As will be appreciated, the countershaft design of the speed and range transmission sections 28 and 30 minimizes the length or size of the transmission 24 without detracting or departing from the versatility thereof. That is, the countershaft design of the speed and range transmission sections 28 and 30, respectively, allows a multitude of gear meshes to be arranged within the sections to accomplish the desired speed ratios for the transmission. Of course, the two-speed planetary assembly 118 further modulates the output of the range transmission section as a function of which clutch assembly 132, 134 is operated to condition the assembly 118.

The drive system 160 further serves to modulate the output of the planetary gear assembly 118. As explained above, the drive system 160 is used to selectively impart rotation to the ring gear 126 of the planetary gear assembly 118 to effect the gear ratio established between the turning output shaft 84 and the transmission output drive shaft 120. In the illustrated embodiment, the drive gear 162 is selectively slidable along the length of shaft 84 to intermesh with the ring gear 126 of the planetary gear assembly 118. In the illustrated embodiment, gear 162 is moved into selective engagement with the ring gear 126 as through idler gears 164. Any suitable means for shifting the drive gear 162 remain within the spirit and broad scope of the present invention. Imparting rotation to the ring gear 126 of the planetary gear assembly 118 substantially reduces the turning ratio output of the transmission output drive shaft 120 relative to the output shaft 84. This substantially reduced or super-low speed output allows the engine 22 of the implement 10 to be operated at a substantially constant speed thus saving energy while providing a super slow ground speed for the implement 10 thereby allowing the workers to perform any special gardening or other field operations requiring a slow moving unit.

As will be appreciated by those skilled in the art, the gear ratio configuration of the drive gear 162 of the drive system 160 and the ring gear 126 of the planetary system 118 will ultimately determine the speed ratio output imparted to the transmission output drive shaft 120. Moreover, it should be appreciated that the gear teeth formations on the drive gear 162 and the ring gear 126 can be selected and configured such that, upon driving engagement between the drive gear 162 and the ring gear 126, reverse rotation will be imparted to the transmission output drive shaft 120.

The transmission assembly of the present invention embodies elongated shaft assemblies that are advantageously comprised of two interconnected and axially aligned shafts. Designing an elongated transmission shaft assembly with two axially aligned and interconnected shafts minimizes shaft deflection while facilitating assembly of the transmission. As will be appreciated, in those transmission designs having both speed and range transmission sections, a one-piece unitary elongated shaft presents significant assembly problems. Designing the elongated shaft from two interconnected axially aligned shafts, however, greatly simplifies by allowing for bench assembly of the shafts prior to their installation within the transmission housing 26.

Historically, each shaft in the transmission was rotatably supported by a bearing set comprising two tapered bearings. The taper on the bearings accepted the axial loading applied to the shafts by the intermeshing helical gears. Accordingly, designing an elongated shaft comprised of two axially aligned shafts heretofore required four bearings and two separate adjustments. With the present invention, one set of three anti-friction bearings is required for rotatably supporting each elongated two piece shaft assembly and only a single adjustment is required for each shaft assembly. With the present invention, an assembly connected at one end of the shaft assembly adjustably positions the outer race of the outermost bearing along the length of the shaft assembly thereby imparting axial adjustments to the remaining bearings in the set thus establishing proper clearances for all the bearings conjointly from a single adjustment. Preferably, shims of different thicknesses are utilized in combination with the adjustment to accurately maintain the proper clearances for the bearings and thereby accurately establishing the end play for the shaft assembly at only one end of the shaft assembly.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A transmission for an off-highway implement, said transmission comprising:

a multi-speed transmission section including an input drive shaft, a countershaft, and a third shaft rotatably arranged in parallel relation within a housing, with a series of gears arranged in operative association with the shafts and a series of hydraulically actuated clutch assemblies for selectively controlling an output of the multi-speed transmission as a function of which clutch assembly is operated;

a multi-range transmission section that is coupled to the multi-speed transmission section and includes rotatable shafts that are axially aligned with said shafts on the multi-speed transmission section, said multi-range transmission section further including a series of gears arranged in operative association with the shafts in the multi-range transmission section and a series of hydraulically actuated clutch assemblies for selectively controlling rotation of an output shaft of the multi-range transmission section as a function of which clutch assembly is operated;

a transmission output drive shaft;

a planetary gear assembly arranged in operative association with the multi-range transmission section output shaft, said planetary gear assembly comprising a sun gear that rotates with said multi-range transmission section output shaft, a planetary gear set operably associated with said transmission output drive shaft, a first hydraulically actuated clutch assembly for controlling rotation of said planetary gear set relative to the transmission output drive shaft thereby developing a first predetermined speed ratio between the turning output of said multi-range transmission section output shaft and said transmission output drive shaft, a ring gear mounted for rotation in said housing, and a second hydraulically actuated clutch assembly for controlling rotation of said ring gear relative to said housing thereby developing a second predetermined speed ratio between the turning output of said multi-range transmission section output shaft and said transmission output drive shaft; and a drive system selectively operated to impart rotation to the ring gear of said planetary gear assembly thereby developing a third predetermined speed ratio between the turning output of said multi-range transmission section output shaft and said transmission output drive shaft.

2. The transmission according to claim 1 wherein said series of gears in the multi-speed transmission section are arranged to form at least three different gear meshes which are selectively coupled to each other such that at least different speed ratios are established between said input drive shaft and said third shaft.

3. The transmission according to claim 1 wherein said series of gears in the multi-range transmission section are arranged to form at least four different gear meshes which are selectively coupled to each other such that at least four different speed ratios are established between the input shaft of a multi-range transmission section and said fourth shaft.

4. The transmission according to claim 1 wherein said multi-range transmission section further includes a clutch operated reverse gear mesh that receives input from the multi-speed transmission section of the transmission and is coupled to the range transmission output shaft through selective operation of a clutch assembly.

5. The transmission according to claim 1 wherein the clutch assemblies in the multi-speed and multi-range transmission section are ON/OFF clutch assemblies, while the first and second clutch assemblies arranged in combination with the planetary gear assembly are modulation clutches.

6. The transmission according to claim 1 wherein said drive system for imparting rotation to the ring gear includes a drive gear that is selectively movable into and out of driving engagement with said ring gear.

7. A transmission for an off-highway implement having front and back ground engaging wheels, a self-propelled engine, and a body including an operator's station, said transmission comprising:

interconnected speed and range countershaft transmission sections that are arranged within a housing, each transmission section including a series of gear meshes that are interconnected with each other through alternative operation of various clutch assemblies for developing a plurality of speed ratios, and wherein said speed transmission section has an input drive shaft connected to said engine, and wherein said range transmission section has an output shaft;

a transmission output drive shaft;

a two-speed planetary section mounted in said housing operably between the output shaft of said range transmission section and said transmission output drive shaft, said planetary section including an input sun gear that rotates with the output shaft of the range transmission section, a ring gear mounted for rotation within said housing about an axis aligned with the axis of the output shaft of the range transmission, and planetary gear meshes rotatably interposed between said sun gear and the said ring gear and carried by a planetary carrier that is operably connected to the transmission output drive shaft, a first clutch for controlling rotation of said ring gear relative to said housing thereby developing a first speed ratio between the turning output of the output shaft of the range transmission section and the transmission output drive shaft, and a second clutch for controlling the rotation of said planetary carrier and the planetary gear meshes relative to said ring gear thereby developing a second speed ratio between the turning output of the output shaft of the range transmission section and the transmission output drive shaft; and a selectively operated drive system for imparting rotation to said ring gear thereby developing a third speed ratio between the turning output of said range transmission section output shaft and the transmission output drive shaft when said first and second clutches of the planetary section allow free rotation of both the ring gear and the planetary carrier.

8. The transmission according to claim 7 wherein selective interconnection between the gear meshes of the speed and range transmission sections allows up to at least twelve different gear ratios to be established between said input drive shaft and said range transmission output shaft.

9. The transmission according to claim 7 wherein the clutch assemblies for interconnecring the gear meshes of said speed and range transmission sections are configured as ON/OFF hydraulically actuated clutch assemblies and the clutch assemblies associated with the two-speed planetary section are hydraulically actuated modulation clutches.

10. The transmission according to claim 7 further including a power-take-off shaft extending from said housing and operably connected to the input drive shaft of the speed transmission section.

11. The transmission according to claim 7 further including a clutch operated gear mesh that receives input from the transmission output drive shaft and provides driving power to the front ground engaging wheels of the implement.

12. The transmission according to claim 7 wherein said drive system comprises a gear mesh operably interposed between said range transmission section output shaft and said ring gear.

13. The transmission according to claim 12 wherein said drive system gear mesh comprises an input drive gear that rotates with said range transmission section output shaft and a gear set interposed between said input drive gear of said drive system gear mesh and said ring gear.

14. The transmission according to claim 13 wherein at least one of said input drive gear and said gear set is selectively shiftable into and out of engagement with each other to effect a driving connection between said range transmission section output shaft and said ring gear.

15. The transmission according to claim 14 wherein said drive system is selectively operated on-the-go from the operator's station of the implement.

16. A transmission for an off-highway implement having a self-propelled engine, and ground engaging wheels that support a body defining an operator's station, said transmission comprising:

interconnected speed and range countershaft transmission sections, with each transmission section having a series of gear meshes that are interconnected with each other through alternate operation of various clutch assemblies, said speed transmission section having an input shaft operably connected to the engine, and wherein said range transmission section includes an output shaft that turns at different speed ratios depending upon which combination of gear meshes are interconnected through the speed and range transmission sections;

a transmission output drive shaft;

a planetary gear assembly arranged in operative association between the output shaft of said range transmission section and the transmission output drive shaft for developing two different sets of output shaft speeds for the transmission output drive shaft for each speed ratio output of the output shaft of the range transmission section; and a drive assembly arranged in operative association with the planetary gear assembly for developing a third different set of output shaft speeds for the transmission output drive shaft for each speed ratio output of the output shaft of the range transmission section.

17. The transmission according to claim 16 wherein said speed transmission section comprises first and second clutch assemblies mounted on said input shaft, a third clutch assembly mounted on a countershaft and fourth and fifth clutch assemblies mounted on a rotatable output shaft so as to develop at least three different speed ratios between said input and output shafts depending upon which clutch assemblies are selectively operated.

18. The transmission according to claim 17 wherein said range transmission section comprises a first clutch assembly arranged in combination with a rotatable countershaft mounted in the range transmission section and a second clutch assembly mounted in combination with the output shaft of the range transmission section.

19. The transmission according to claim 18 wherein said range transmission section further includes a rotatable shaft mounted parallel to the countershaft of the range transmission section and that rotates with the input shaft of said speed transmission section, a gear mesh interposed between said rotatable shaft and said range transmission section output shaft, and a reverse clutch assembly operably associated with said gear mesh for selectively imparting reverse rotation to the range transmission section output shaft.

20. The transmission according to claim 16 wherein said drive assembly includes a gear set comprised of a plurality of gears arranged between the range transmission section output shaft and said ring gear.

21. The transmission according to claim 20 wherein at least one gear in said plurality of gears is selectively movable between a first position, wherein said at least one gear intermeshingly engages said ring gear with said output shaft of said range transmission section, and a second position, wherein said at least one gear in said plurality of gears is prevented from imparting rotation to said ring gear.

22. The transmission according to claim 21 wherein the position of said at least one gear is controlled from the operator's station of the implement.

23. The transmission according to claim 20 wherein said gear set comprises a plurality of gears that are in constant intermeshing relationship with said ring gear, and an input drive gear that is shiftable movable along the axis of said range transmission section output shaft between an operable position, wherein said input drive gear is intermeshingly engaged with said range transmission section output shaft and said ring gear through said plurality of gears, and an inoperable position, wherein said input drive gear is ineffective to rotate said ring gear.

24. The transmission according to claim 23 wherein the shiftable position of said input drive gear is controlled on-the-go from the operator's station of the implement.

25. A compact transmission for an off-highway implement having a self-propelled engine that normally operates at a substantially constant speed during field operations of the implement, front and rear pairs of ground engaging wheels that support a body including an operator's station, said transmission comprising:

interconnected speed and range countershaft transmission sections that are arranged within a housing, each transmission section including a series of gear meshes that are interconnected with each other through alternative operation of various hydraulically actuated clutch assemblies for developing a plurality of speed ratios, and wherein said speed transmission section has an input drive shaft connected to said engine, and wherein said range transmission section has an output shaft;

a transmission output drive shaft rotatably supported by said housing;

a planetary gear assembly operably arranged in said housing between said range transmission section and driven by said range transmission section output shaft, said planetary gear assembly comprising a sun gear that turns with the range transmission section output shaft, a planetary gear set including a planetary carrier that turns with the transmission output drive shaft and has a plurality of planetary gears in intermeshing relationship with the sun gear and a ring gear, with the ring gear being mounted for rotation within said housing about the rotatable axis of the transmission output drive shaft, a first hydraulically operated brake for anchoring the ring gear to the housing thereby operating the planetary gear assembly and thus the transmission output drive shaft in a low-speed condition, a second hydraulically operated apparatus for coupling the planetary carrier to the ring gear thereby operating the planetary gear assembly and thus the transmission output drive shaft in a direct-speed condition; and a drive system selectively operated to impart rotation to the ring gear of the planetary gear assembly thereby operating the planetary gear assembly and thus the transmission output drive shaft in a super low speed condition.

26. The transmission according to claim 25 wherein the speed ratios of said speed and range transmission sections are related such that at least twelve different output shaft speeds are achievable through alternative operation of the hydraulically actuated clutch assemblies.

27. The transmission according to claim 25 wherein said drive system comprises a gear mesh interposed between the output shaft of said range transmission section and said ring gear.

28. The transmission according to claim 27 wherein said gear mesh includes a plurality of gears rotatably mounted to said housing and in constant intermeshing relationship with said ring gear, and an input drive gear that is selectively moved into and out of engagement with said plurality of gears to selectively impart rotation to said ring gear.

29. The transmission according to claim 28 wherein said input drive gear is resiliently biased toward a non-engaged position relative to said plurality of gears.

30. The transmission according to claim 28 wherein said input drive gear selectively intermeshes with said output drive shaft and said plurality of gears and is slidably movable along a path extending generally parallel to said range transmission output shaft.

31. The transmission according to claim 30 wherein said input drive gear is shiftable along said path from a location in said operator station.

32. A transmission for an off-highway implement, said transmission comprising:

interconnected speed and range transmission sections that are arranged within a housing, each transmission section including a series of gear meshes that are selectively interconnected to each other through alternate operation of various clutch assemblies for developing a plurality of speed ratios, and wherein said speed transmission section includes an input drive shaft that is connected to a power source on the implement, and wherein said range transmission section includes an output shaft;

a transmission output drive shaft;

a two-speed planetary gear assembly arranged in operative association between the range transmission section output shaft and the transmission section output drive shaft for developing two different sets of output shaft speeds for the transmission output drive shaft for each speed ratio input of the range transmission section output shaft, said two speed planetary gear assembly including a sun gear that rotates with the range transmission section output shaft, a rotatable ring gear that is concentrically mounted about said sun gear, and a planetary gear set including a planetary carrier that turns with the transmission output drive shaft and has a plurality of planetary gears in intermeshing relationship with the sun gear and the ring gear, a selectively operated brake for anchoring the ring gear to the housing thereby operating the planetary gear assembly and thus the transmission output drive shaft in a low speed condition, an apparatus for selectively coupling the planetary carrier to the ring gear thereby operating the planetary gear assembly and thus the transmission output drive shaft in a direct speed condition; and a drive system selectively operated to impart rotation to the ring gear of the planetary gear assembly thereby imparting a reverse direction of rotation to the transmission output drive shaft.

33. A transmission assembly for an off-highway implement, said transmission comprising:

a housing;

a plurality of gear meshes mounted on a series of shafts including an input shaft that connects to a power source and an output shaft, each shaft being rotatably supported by the housing;

a series of clutch assemblies for operably and selectively coupling various gear meshes to each other for effecting the transfer of power from one shaft to another, and wherein each gear mesh is capable of developing a specified speed ratio between the input and output shafts;

a transmission output drive shaft rotatably supported by the housing;

a two speed planetary gear assembly arranged in operative association between the output shaft and said transmission output drive shaft for developing two different sets of shaft speeds for the transmission output drive shaft for each specified speed ratio of said output shaft; and a drive assembly arranged in operative association with the planetary gear assembly for developing a third different set of shaft speeds for the transmission output drive shaft for each specified speed ratio output of said output shaft.

34. The transmission assembly according to claim 33 wherein said planetary gear assembly includes an input sun gear that rotates with the output shaft, a ring gear mounted for rotation in said housing, and planetary gear meshes rotatably interposed between the sun gear and the ring gear and carried by a planetary carrier that is connected to the transmission output shaft, a first clutch for controlling rotation of said ring gear relative to said housing, and a second clutch for controlling rotation of the planetary carrier and the planetary gear meshes relative to said ring gear.

35. The transmission assembly according to claim 34 wherein said drive system comprises a gear mesh interposed between said output shaft and said ring gear.

36. The transmission assembly according to claim 35 wherein said drive system gear mesh comprises a gear that rotates with said output shaft and a gear set interposed between said gear of said drive system and said ring gear.

37. The transmission assembly according to claim 36 wherein at least one of said gear and a gear of said gear set is shiftable into and out of engagement with each other to effect a driving connection between the output shaft and the ring gear of the planetary gear assembly.

38. A transmission assembly for an off-highway implement having an operator's station, said transmission comprising:

a housing;

a plurality of gear meshes mounted on a series of shafts including an input shaft that connects to a power source and an output shaft, each shaft being rotatably supported by the housing;

a series of clutch assemblies for operably and selectively coupling various gear meshes to each other for effecting the transfer of power from one shaft to another, and wherein each gear mesh is capable of developing a specified speed ratio between the input and output shafts;

a transmission output drive shaft rotatably supported by the housing; and a planetary section mounted in said housing operably between the output shaft and the transmission output drive shaft, said planetary section including first and second sun gears that rotate with the output shaft, a ring gear mounted for rotation within the housing about an axis aligned with the axis of the transmission output drive shaft, and planetary gear meshes rotatably interposed between the first sun gear and the ring gear and carried by a planetary carrier that is connected to the transmission output drive shaft, and wherein said second sun gear is either selectively coupled to the ring gear to impart rotation thereto or is uncoupled therefrom thus inhibiting the second sun gear from imparting rotation to said ring gear, said planetary section further including a first clutch for controlling rotation of said ring gear relative to said housing and a second clutch for controlling rotation of said planetary carrier and the planetary gear meshes relative to the ring gear.

39. The transmission assembly according to claim 38 further including an auxiliary gear mesh arranged about and operably interposed between said second sun gear and said ring gear.

40. The transmission assembly according to claim 39 further including an apparatus for moving at least one of said second sun gear and a gear of said auxiliary gear mesh into and out of position relative to each other thereby controlling the transfer of rotary power to the ring gear.

41. The transmission assembly according to claim 40 wherein said apparatus for moving said at least one of said second sun gear and said gear of said auxiliary gear mesh is controlled from the operator station of the implement.

42. The transmission assembly according to claim 40 wherein said apparatus for moving said at least one of said second sun gear and said gear of said auxiliary gear mesh is controlled on-the-go from the operator station of the implement.

43. A transmission assembly for an off-highway implement, comprising:

a housing;

a plurality of selectively operable gear meshes arranged within said housing for transferring rotary power between generally parallel shaft assemblies and for developing speed ratios between said shafts, each gear mesh comprising at least first and second intermeshing helical gears, said first gear being mounted on a first elongated shaft assembly while said second gear is mounted on a second elongated shaft assembly, and wherein each helical gear imparts axial movement to the shaft assembly on which it is mounted upon engagement of the respective gear mesh;

wherein each shaft assembly comprising at least first and second axially aligned shafts that are spline connected to each other intermediate opposite ends thereof;

a set of three axially aligned bearings disposed between opposite ends of and for rotatably mounting each elongated shaft assembly within said housing, with each bearing including inner and outer races with anti-friction elements therebetween, said bearing set comprising first and second conical roller bearings disposed in opposed relation relative to each other at outer ends of the first and second shafts of a respective shaft assembly and a cylindrical roller bearing mounted adjacent to the spline connection between the first and second shafts of the respective shaft assembly, with the inner race of each conical roller bearing being mounted on a respective one of the shafts of the shaft assembly to transfer axial movement of the respective shaft and with the outer race of said second conical roller bearing being mounted in the housing to limit its movement, and wherein the inner race of said cylindrical roller bearing is disposed to transfer axial movement from the first shaft to the second shaft; and an adjustment assembly connected to the housing to adjustably position the outer race of the first conical roller bearing relative to said first shaft thereby imparting axial adjustments to the respective shaft assembly thus selectively and conjointly setting clearances for both conical roller bearings from only one end of the respective shaft assembly.

44. A transmission assembly for an off-highway implement, comprising:

a casing;

a plurality of selectively operable gear meshes arranged within said casing for transferring rotary power between generally parallel shaft assemblies and for developing speed ratios between said shafts assemblies, each gear mesh comprising at least first and second intermeshing helical gears, said first gear being mounted on a first elongated shaft assembly while said second gear is mounted on a second elongated shaft assembly, and wherein each helical gear imparts axial movement to the shaft assembly on which it is mounted upon engagement of the respective gear mesh;

wherein each shaft assembly comprises at least first and second axially aligned shafts that are spline connected to each other intermediate opposite ends thereof;

a set of three axially aligned bearings disposed between opposite ends of and for rotatably mounting each elongated shaft assembly within said casing, each bearing including inner and outer races with anti-friction elements therebetween, with two outer bearings being mounted toward outer ends of the first and second shafts of a respective shaft assembly and a third bearing being mounted adjacent to the spline connection between the first and second shafts of the respective shaft assembly, with the inner race of each bearing being mounted on a respective one of the shafts of the shaft assembly to transfer axial movement of the respective shaft and with the outer race of the outer bearing mounted on said second shaft being mounted in the casing to limit axial movement of said outer race in a predetermined direction, and wherein the inner race of said third bearing being disposed to transfer axial movement from the first shaft to the second shaft; and an assembly connected to the casing to adjustably position the outer race of the other of said outer bearings relative to said first shaft thereby imparting axial adjustments to the respective shaft assembly thus selectively and conjointly setting clearances for the bearings from only one end of the respective shaft assembly.

45. The transmission according to claim 44 wherein said adjustment assembly comprises a housing that fits over the shaft assembly and is secured to the casing with threaded fasteners, with one or more shims being disposed between said housing and said casing to adjustably position the shaft assembly within said casing.

46. The transmission according to claim 44 wherein each shaft of the respective shaft assemblies includes a plurality of rings operably coupled to the respective shaft to one or the other side of the inner race of the one or more of the bearings.

* * * * *